United States Patent
Hulick et al.

(10) Patent No.: US 12,375,482 B2
(45) Date of Patent: Jul. 29, 2025

(54) ENHANCED CLOUD ACCESS SECURITY BROKER FUNCTIONALITY UTILIZING IN-BAND APPLICATION OBSERVABILITY

(71) Applicant: Cisco Technology, Inc., San Jose, CA (US)

(72) Inventors: Walter Hulick, Pearland, TX (US); David John Zacks, Vancouver (CA); Thomas Szigeti, Vancouver (CA); Nagendra Kumar Nainar, Morrisville, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 211 days.

(21) Appl. No.: 18/174,177

(22) Filed: Feb. 24, 2023

(65) Prior Publication Data
US 2024/0291816 A1  Aug. 29, 2024

(51) Int. Cl.
*H04L 9/40* (2022.01)

(52) U.S. Cl.
CPC ...... *H04L 63/0876* (2013.01); *H04L 63/0245* (2013.01); *H04L 63/20* (2013.01)

(58) Field of Classification Search
CPC .. H04L 63/0876; H04L 63/0245; H04L 63/20
See application file for complete search history.

(56) References Cited

U.S. PATENT DOCUMENTS

| | | | | |
|---|---|---|---|---|
| 7,702,724 B1* | 4/2010 | Brydon | ................... | H04L 67/51 709/224 |
| 11,271,972 B1* | 3/2022 | Ravi | ................... | H04L 63/0236 |
| 2008/0289019 A1* | 11/2008 | Lam | ........................ | G06F 21/41 726/5 |

(Continued)

FOREIGN PATENT DOCUMENTS

KR  10-2018-0119177 A  11/2018

OTHER PUBLICATIONS

JWT, "Introduction to JSON Web Tokens," retrieved from https://jwt.io/introduction, on Jan. 13, 2023, 12 pages.

(Continued)

*Primary Examiner* — Mohammed Waliullah
(74) *Attorney, Agent, or Firm* — Edell, Shapiro & Finnan, LLC

(57) ABSTRACT

Provided herein are techniques to facilitate enhanced cloud access security broker (CASB) functionality via in-band application observability in which a CASB can be implemented in-line between the client device and an embedded application security service. In one instance, a method may include, obtaining, by a CASB from a client device, a first message for an application transaction involving an application operating via the client device. The first message can be augmented to include first security metadata and can be forwarded to trigger one or more actions by an embedded application security service associated with the application. The CASB may obtain a second message from the embedded application security service that includes second security metadata, and one or more actions can be triggered at the CASB based, at least in part, on the second security metadata included in the second message.

20 Claims, 5 Drawing Sheets

(56) References Cited

U.S. PATENT DOCUMENTS

| | | | |
|---|---|---|---|
| 2012/0210046 A1* | 8/2012 | Ito | G06F 3/0679 |
| | | | 711/E12.008 |
| 2019/0028455 A1* | 1/2019 | Yue | H04L 63/0884 |
| 2020/0084281 A1* | 3/2020 | Ley | H04L 67/141 |
| 2022/0046059 A1* | 2/2022 | Pandurangi | H04L 63/20 |
| 2022/0311820 A1* | 9/2022 | Lewin | G06F 16/9574 |
| 2023/0199002 A1* | 6/2023 | Kaidi | H04L 63/1425 |
| | | | 726/22 |

OTHER PUBLICATIONS

Cisco, "What Is a CASB?," retrieved from https://www.cisco.com/c/en/us/products/security/what-is-a-casb.html#~choosing-a-casb, on Jan. 13, 2023, 4 pages.
Jones, et al., "JSON Web Token (JWT)," Internet Engineering Task Force (IETF), Request for Comments: 7519, May 2015, 30 pages.

* cited by examiner

ENHANCED CLOUD ACCESS SECURITY BROKER FUNCTIONALITY UTILIZING IN-BAND APPLICATION OBSERVABILITY

TECHNICAL FIELD

The present disclosure relates to network equipment and services.

BACKGROUND

Networking architectures have grown increasingly complex in communication environments. Applications operating in a network typically communicate with an application service that is often hosted in a cloud network. There are many security concerns regarding communications between applications and application services and, thus, opportunities exist to secure communications between applications and application services.

DETAILED DESCRIPTION

Overview

Figure 1A:
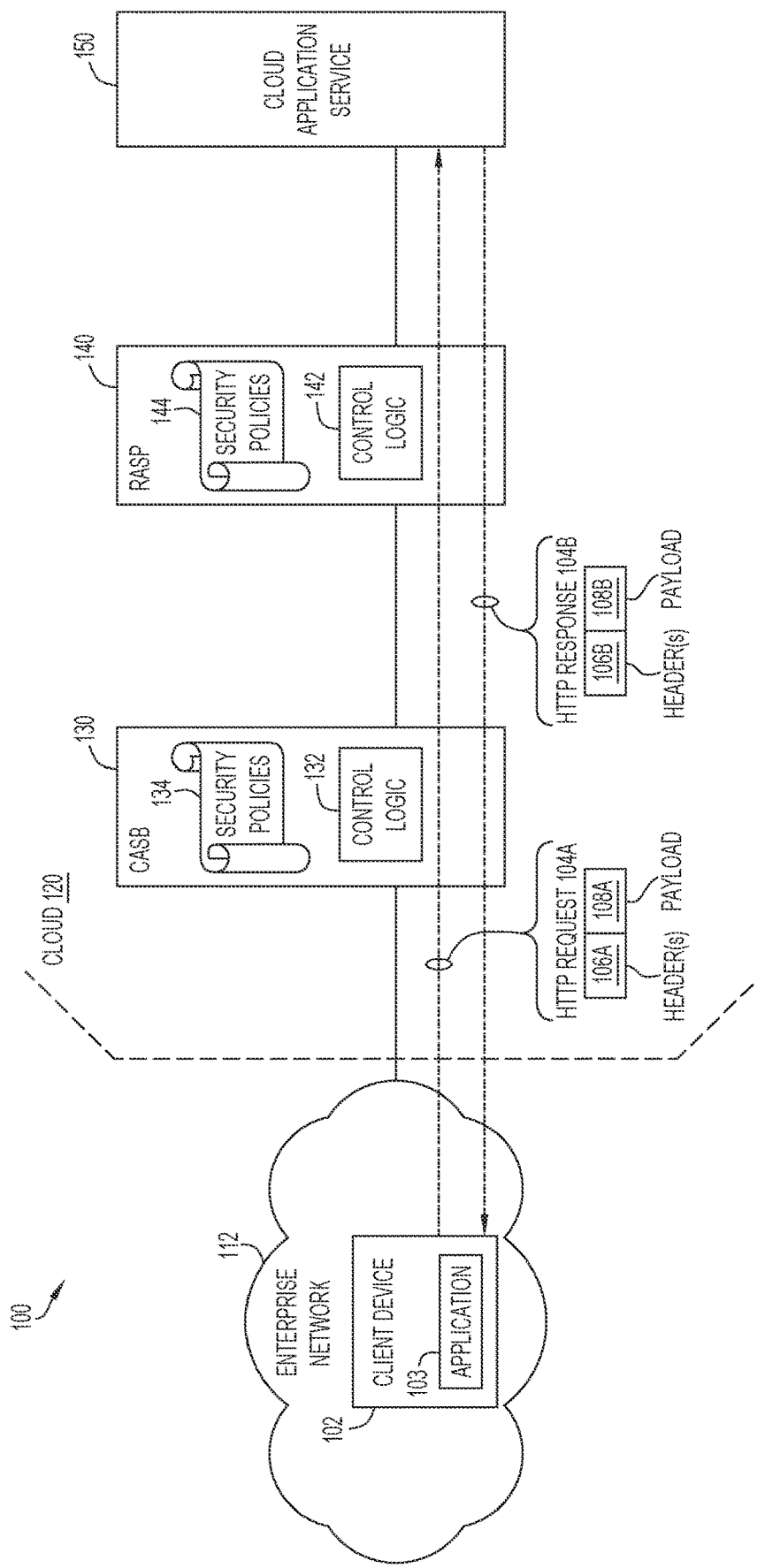
FIG. 1A is a block diagram of a system that may facilitate enhanced cloud access security broker (CASB) functionality via in-band application observability, according to an example embodiment.

Provided herein are techniques through which a cloud access security broker (CASB) and at least one observability agent or embedded application security service, such as a runtime application self-protection platform (RASP), can be enhanced to facilitate a Real-Time Transaction Integration Protocol such that the CASB and the at least one embedded application security service can exchange real-time, full-duplex communications.

Utilizing the Real-Time Transaction Integration Protocol, the CASB, being implemented in-band for application transactions between a client device/application operating via the client device and a corresponding embedded application security service/cloud application service, can insert security metadata, such as information, commands, queries, etc. into a Hypertext Transfer Protocol (HTTP) request message received from a client device/application for a given application transaction and forward the augmented HTTP request message to the embedded application security service. The security metadata can be stored/consumed by and/or trigger one or more actions by the embedded application security service. The embedded application security service can also insert security metadata into an HTTP response message received from the cloud application service and forward the augmented HTTP response message to the CASB, which can stored/consumed by and/or trigger one or more actions by the CASB.

Such full-duplex communications provided in accordance with embodiments herein may improve and/or inform the security posture between the CASB and the at least one embedded application security service and/or, in some instances between the CASB and one or more in-line security service(s) provided in-line between the CASB and one or more client devices.

In one embodiment, for example, a computer-implemented method is provided that may include obtaining, by a cloud application security broker from a client device, a first message for an application transaction involving an application operating via the client device; augmenting the first message to include first security metadata that is to trigger one or more actions by an embedded application security service associated with the application in which the cloud application security broker is implemented in-line for communications between the client device and the embedded application security service; forwarding the first message that includes the first security metadata to the embedded application security service; obtaining, from the embedded application security service, a second message for the application transaction that includes second security metadata; and triggering one or more actions at the cloud application security broker based, at least in part, on the second security metadata included in the second message.

Example Embodiments

Cloud access security brokers (CASBs) have become a key security platform or service that can be offered in cloud native environments. A CASB can be characterized as a visibility and control point that can perform various functions, such as providing access control to cloud applications, providing data protection (e.g., to mitigate the leaking of confidential data), providing threat protection, ensuring regulatory compliance, etc.

CASB's are not only common but may also be considered an integral component of the cloud environments. The market size is expanding and CASB vendors entering the market are expanding. To a certain extent current CASB solutions have become commoditized, offering similar functionality, such as data loss prevention (DLP), threat detection, identity management, and visibility, which may be considered similar to web application firewall (WAF) capabilities with added data protection capabilities designed for cloud.

In some instances, CASBs may be implemented as 'in-line' devices such that they may be connected between cloud application users (e.g., client devices operating various applications) and the cloud services (e.g., cloud application servers/services) themselves in order to monitor application/application server/service communications, typically referred to as 'transactions'. In some instances, CASBs may be implemented as 'out-of-band' devices, however, such out-of-band CASBs may be less effective in monitoring and policy enforcement of application transactions.

Inline CASBs can monitor traffic and user activity, automatically block threats and risky sharing, and enforce security policies such as authentication and alerting. As such, a key strength of inline CASBs is their visibility and analysis of application transactions, such as requests made to cloud application services as well as responses from the cloud application services.

However, current inline CASB implementations may have no visibility, or at least no direct visibility, into actions that are executed within cloud application services, sometimes referred to as cloud application microservices, that generate responses to requests from applications. For example, current implementations of inline CASBs may have no direct visibility into an application request to determine whether the request is suspicious, anomalous, or may be seeking to trigger a known application runtime vulnerability. Such relevant security aspects may not be determined by current implementations of inline CASBs.

On the other hand, an embedded application security service, such as a runtime application self-protection platform (RASP), that can be dynamically bound to a cloud application service but not considered part of the cloud application service may be well-positioned to address such security aspects. As such, inline CASBs currently implemented in network deployments may have no real visibility into application transactions with regard to the topology, the components involved, the transaction risks, etc., as such information typically exists within the application runtime domain, which, generally speaking, is opaque to inline CASB implementations, but is fully visible to an embedded application security service, such as a RASP.

Since these two platforms (the CASB and the RASP) share complementary views of the same user transactions, there exists potential for these platforms to integrate their respective views to compose a more comprehensive and holistic picture of the user transactions in order to improve security decisions and/or maintain security state for transactions.

There are known solutions that communicate with different security products, such as WAFs, firewalls, deep packet inspection (DPI) platforms, etc.; however, such communication typically consists of either sharing and parsing logs (which is non-real-time and highly computationally intensive) or via communicator feeds that utilize proprietary formats (i.e., having no common format). These communication methods are not real-time, nor in-band, nor, generally speaking, flexible and extensible. Thus, CASB/RASP solutions heretofore known do not provide secure communications between CASBs and RASPs (as well as other security-related platforms) to share complimentary information in a secure, real-time, and extensible manner.

Accordingly, embodiments herein facilitate a novel integration of application observability technology for CASB products to enhance and expand their awareness, intelligence, and capabilities in order to provide security to cloud native environments. In particular, embodiments presented herein facilitate exchanging information between a CASB and a RASP (e.g., an embedded application security service) in an in-band secure, real-time, flexible, and extensible manner. Further, embodiments presented herein can be extended to facilitate the secure exchange of information with any inline security system, such as firewalls, WAFs, DPI platforms, etc.

Referring to FIG. 1A, FIG. 1A is a block diagram of a system 100 that may facilitate enhanced cloud access security broker (CASB) functionality via in-band application observability, according to an example embodiment. System 100 may include a CASB 130, a RASP 140, and a cloud application service 150. Also shown in FIG. 1A is a client device 102, which may be configured with an application 103 (e.g., application logic, program, software/software function, etc.) that operates via client device 102 and is configured to communicate with cloud application service 150 via various communications, referred to herein as application transactions. CASB 130, RASP 140, and cloud application service 150 may be operated in a cloud native network environment, shown in FIG. 1A as cloud 120.

Client device 102 may be any laptop computer, desktop computer, tablet, smartphone, or a virtual device, such as a virtual desktop or virtual PC associated with a particular end user of client device 102. An end user or user of client device 102 may be, for example, an employee of a given enterprise entity (e.g., a business entity, government entity, educational entity, etc.) in which client device is connected to an enterprise network 112 that interfaces with CASB 130. CASB 130 may further interface with RASP 140, which may further interface with cloud application service 150 via cloud 120 network interfaces/connections. Cloud application service 150 may facilitate various operations/services that can be performed by client device 102 via application 103 (e.g., to access a web page, download a multimedia stream, access application data, access a cloud database, search for a vendor product, perform a financial transaction, or any other user and/or application initiated transaction).

CASB 130 may include control logic 132 that can include instructions that, when executed, causes CASB 130 (e.g., processor(s) (not shown) configured for CASB 130) to perform operations as discussed for embodiments herein. CASB 130 may also be configured/store one or more security policies 134 that may be utilized to facilitate various operations for CASB 130 as discussed for embodiments herein.

In accordance with embodiments herein, CASB 130 is implemented in-line between client device 102 and RASP 140/cloud application service 150 such that CASB 130 can be used to manage/facilitate application communications or applications transactions between client device 102 and cloud application service 150 in accordance with security policies 134 (e.g., security policies of the enterprise entity operating enterprise network 112 and/or security policies of a cloud entity operating cloud 120), such as, for example, to provide access and/or usage maybe control to cloud application service 150, to provide data protection (to mitigate the leaking of confidential data) for cloud application service 150 transactions, to provide threat protection, to ensure regulatory compliance, etc.). Although CASB 130 is illustrated in FIG. 1A as being implemented within cloud 120, in some embodiments CASB 130 may be implemented within enterprise network 112.

RASP 140 may include control logic 142 that can include instructions that, when executed, causes RASP 140 (e.g., processor(s) (not shown) configured for RASP 140) to perform operations as discussed for embodiments herein. RASP 140 may also be configured/store one or more security policies 144 that may be utilized to facilitate various operations for RASP 140 as discussed for embodiments herein.

In accordance with embodiments herein, RASP 140 may be a security service enabled on/for the cloud application service 150 that may regulate, manage, facilitate, or otherwise enforce security-related services in accordance with security policies 144 for application transactions involving cloud application service 150 and application 103 operated via client device 102. RASP 140 may be characterized as an 'observability agent' or an embedded application security service that is dynamically bound to cloud application service 150 but is not considered part of the cloud application service 150.

To illustrate various communications that may be provided via system 100, consider an example application transaction involving application 103 and cloud application service 150 for the embodiment of FIG. 1A, such as a Hypertext Transfer Protocol (HTTP) request/response exchange between application 103. As shown in FIG. 1A a user request (e.g., a request initiated via application 103), such as to access a web page, download a multimedia stream, access application data, access a cloud database, search for a vendor product, perform a financial transaction, or any other user and/or application initiated transaction can involve application 103 generating an (encrypted) HTTP request message 104A and sending the HTTP request message 104A towards cloud application service 150. Per-HTTP conventions, the HTTP request message 104A can include one or more HTTP header(s) 106A and a payload 108A.

Via enterprise network 112, the user request can be redirected to CASB 130 which sits in-line between the user/client device 102 and RASP 140/cloud application service 150. CASB inspects and subjects the HTTP request message 104A to security policies 134. If permitted by policy, the request is then sent by CASB 130 to RASP 140 such that RASP 140 can also inspect and subject the request to various security policies 144 and, if permitted, can send the HTTP request message 104A to cloud application service 150.

In responding to the request, the cloud application service 150 can generate and transmit an HTTP response message 104B that also includes one or more header(s) 106B and a payload 108B. The response can be inspected by the RASP 140 per security policies 144 and, if permitted, directed to CASB 130 such that the HTTP response message 104B from the cloud application service 150 is also inspected and subjected to security policies 134 (e.g., data leakage protection policies, etc.) by CASB 130 in the return direction. If permitted by policy, CASB 130 can then forward the HTTP response message 104B toward the user/client device 102/application 103.

Figure 1B:
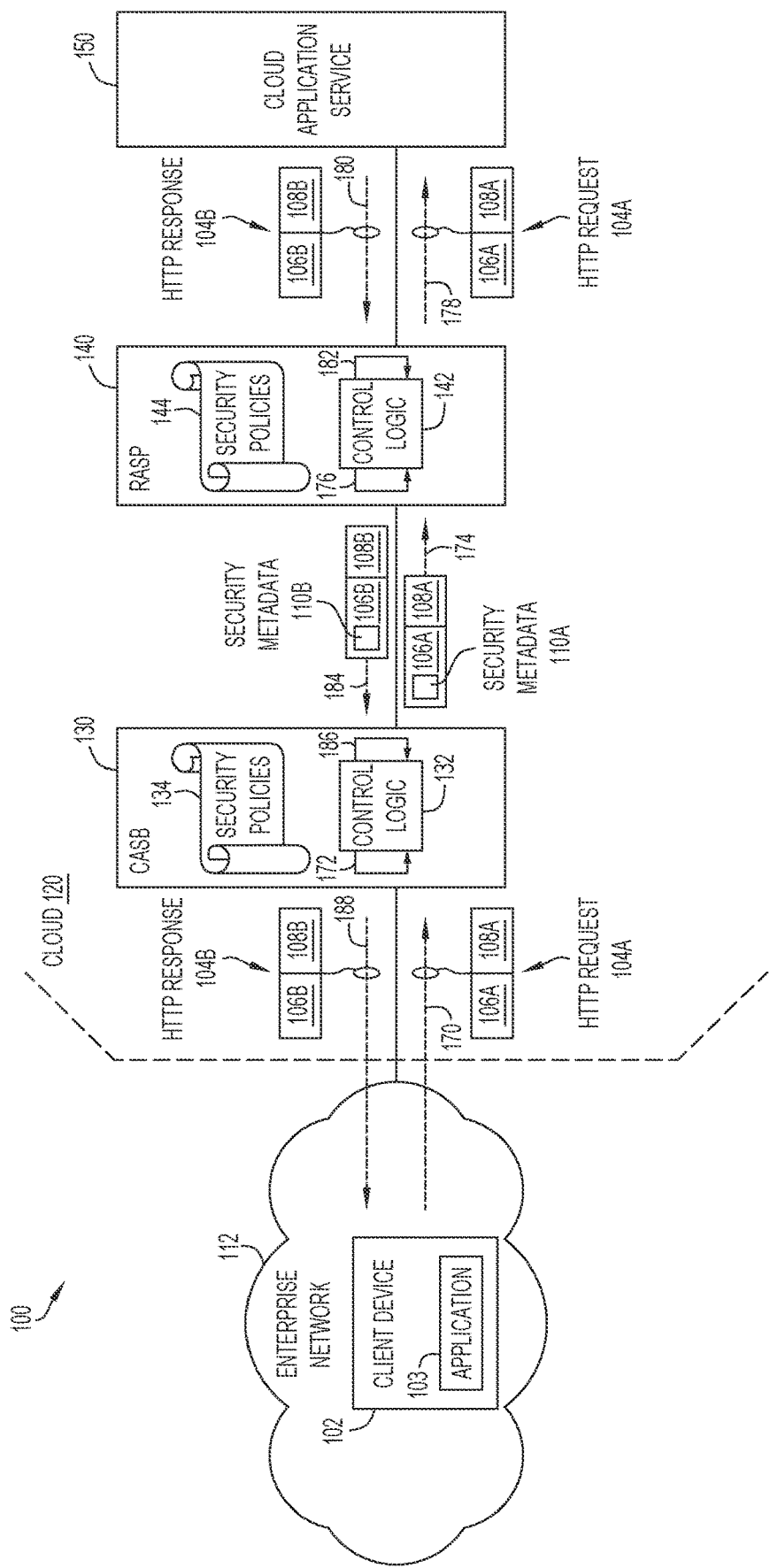
FIG. 1B is a block diagram illustrating example operations that may be performed via the system of FIG. 1A in order to facilitate enhanced CASB functionality, according to an example embodiment

In accordance with embodiments herein, such request/response operations involving CASB 130 and RASP 140 can be enhanced, as illustrated in FIG. 1B, in order to facilitate enhanced CASB functionality in order to effectively enable in-band, real-time, extensible communication between the CASB 130 and the RASP 140 that is enabled on the cloud application service 150. Since the CASB 130 is in-line for application transactions exchanged between client device 102/application 103 and RASP 140/cloud application service 150, the CASB 130 can insert security metadata directly into a transaction header, such as security metadata 110A that can be inserted within header 106A of HTTP request message 104A for FIG. 1B in which the security metadata 110A can be consumed by and/or trigger one or more actions by RASP 140. Similarly, for the HTTP response message 104B generated by cloud application service 150, the RASP 140 can insert security metadata 110B into header 106B of the HTTP response message 104B that is directed to CASB 130. Any such metadata inserted into transaction headers may not be seen by the application 103/cloud application service 150.

Such augmentation of headers for application transactions as may be provided by CASB 130 and RASP 140 via corresponding security metadata that can be augmented into transaction headers may advantageously facilitate full-duplex communications between the CASB and the RASP 140. In at least one embodiment, such communications involving security metadata augmentation can be facilitated via Java Script Object Notation (JSON) Web Tokens (JWTs).

JWTs are data structures that can be inserted into HTTP headers. As prescribed at least by Internet Engineering Task Force (IETF) Request for Comments (RFC), 7519, a well-formed JWT consists of three concatenated Base64url-encoded strings, separated by dots (.), including a header, a payload, and a signature (e.g., <XXXX.YYYY.ZZZZ> corresponding to <header.payload.signature>) The header include metadata about the type of a corresponding token and the cryptographic algorithms used to secure its contents. The payload can include security metadata, such as verifiable security statements (e.g., the identity of a user, permissions allowed, etc., as discussed herein). The signature is used to validate that the token is trustworthy and has not been tampered with.

Such full-duplex communications provided between the CASB 130 and the RASP 140 utilizing JWTs may provide has several advantages over current CASB implementations. For example, the full-duplex communications provided in accordance with embodiments herein can be provided in real-time, as security metadata can be inserted/augmented into and read directly from relevant packets exchanged between the CASB 130 and the RASP 140. Further, the full-duplex communications provided in accordance with embodiments herein can be provided in a secure manner, as the security metadata can be both signed and then encrypted (along with the contents of the HTTP payload) for a corresponding transaction message/packet. JWTs are already widely used for authentication purposes by microservices.

Additionally, the full-duplex communications provided in accordance with techniques herein may be extensible; JWT payload structures are highly flexible and, thus, can enable a set of claims included in a JWT payload to be expressed as key/value pairs. Still further the full-duplex communications provided in accordance with techniques herein are efficient, as no out-of-band signaling nor any computational correlation may be needed to facilitate communications between the CASB 130 and the RASP 140, as the security metadata can be fully-embedded within the transaction data packets themselves.

In some instances, such an in-band, full-duplex communication may be referred to as a Real-Time Transaction Integration Protocol (RTIP or RT-TIP). In accordance with embodiments herein, consider various example operations that may be provided by an enhanced CASB 130 and an enhanced RASP 140 leveraging such RTIP communications, as discussed in further detail below.

Consider one example in which full-duplex communications between the CASB 130 and RASP 140 may be provided. For example, as shown at 170, consider that client device 102/application 103 generates an (encrypted) user request, such as HTTP request message 104A (including header(s) 106A and payload 108A), and transmits the request toward cloud application service 150 and the request is redirected via enterprise network 112 to CASB 130. At 172, CASB inspects and subjects the request to security policies 134. If the request is permitted to be passed to the cloud application service 150, the CASB injects or otherwise augments the HTTP request message 104A with security-relevant metadata. For example, security metadata 110A can be injected into the packet header(s) 106A via one or more JWTs.

In some embodiments, security metadata 110A inserted into an application transaction message can include, but not be limited to, a user identifier (user-ID) for the user associated with a client device (e.g., client device 102), a client device identifier (e.g., Internet Protocol (IP) address and/or Media Access Control (MAC) address of client device 102), the method or type of network access of a client device, client device location, a transaction correlation/context identifier (ID) generated by the CASB 130 for the transaction, combinations thereof, and/or the like. In still some embodiments, security metadata 110A inserted into an application transaction message can include a query that identifies at least one of one or more types of information that the CASB 130 is requesting from the RASP 140 and/or one or more actions that the CASB 130 is requesting be performed by the RASP 140 for the application transaction. For example, in some embodiments, CASB 130 may query/request RASP 140 to perform one or more action (e.g., suspend a user account, determine security risk of a request and/or a user, initiate telemetry gathering for user/application, request RASP 140 to initiate enhanced authentication of user, etc.), may request one or more types of information be sent from the RASP 140 to the CASB 130 (e.g., information indicating a security risk of the client device 102, the user, and/or the HTTP request, etc.), and/or may provide one or more types of information associated with a request (e.g., client device 102 location, client device 102 IP address, network access method or type of client device 102, etc.) that may inform or otherwise augment the query/request that the CASB 130 initiates towards the RASP 140.

In some embodiments, each of different type(s) of security metadata may be inserted into the header(s) 106A as separate JWTs; however, different security metadata may be combined into a single JWT in some embodiments. For example, in some embodiments, a bitmap approach may be utilized in which each bit of a number of bits present in security metadata augmented for an HTTP request message may identify different information and/or actions that the CASB 130 is requesting from the RASP 140. Such use of a bitmap inserted in an HTTP header may reduce the amount of information or number of JWTs that may be needed to enable the full-duplex communication between the CASB 130 and the RASP 140.

As shown at 174, the CASB 130 forwards the augmented HTTP request message 104A, which is received and analyzed by the RASP 140, as shown at 176. For example, the RASP 140 can apply application-related security policies, such as security policies 144, to the received request in which the security policies that are applied/enforced may be based on the security metadata 110A that has been injected into the HTTP headers by the CASB 130 or, alternatively, may be based on a combination of the CASB-injected security metadata 110A and RASP-observed behavior within the application runtime environment.

In various embodiments, policy-actions that the RASP 140 could enforce based on security policies 144 and security metadata 110A included in the HTTP request message 104A may include, but not be limited to, restricting access to requested application resources (e.g., blocking a Remote Procedure Call (RPC), preventing the opening of a socket, etc.), reporting the suspicious request as an event to the CASB and/or a Security Information and Event Management (SIEM) system (not shown), auto-configuring parameters within the RASP to prepare for a potential threat (e.g., triggering an auto-escalation of defenses), triggering deeper Open Telemetry (OTEL) gathering relating to the session (e.g., triggering an OTEL trace), requesting a deep dive on the user (for back-end analysis based suspicion), requesting stepped-up or enhanced authentication of the user, blocking the transaction entirely, combinations thereof, and/or the like. In some embodiments as discussed above, the CASB 130 may request specific action(s) be performed by the RASP 140 and/or may request specific information be provided by the RASP 140 via security metadata 110A included in the HTTP request message 104A.

If permitted by security policies 144, the RASP 140 forwards the HTTP request message 104A to cloud application service 150, as shown at 178, after removing security metadata 110A from the HTTP request message 104A. Thus, the RTIP communications between CASB 130 and RASP 140 are transparent to the cloud application service 150 such that the cloud application service 150 is not aware of the RTIP communications (e.g., information and/or queries sent from CASB 130 to RASP 140). In response to the HTTP request message 104A, cloud application service 150 can generate and transmit an HTTP response message 104B (including HTTP header(s) 106B and HTTP payload 108B) for the transaction that is directed to RASP 140, as shown at 180.

As shown at 182, the RASP 140 may also augment the HTTP header(s) 106B of the HTTP response message 104B to inject security metadata 110B into the header(s) such that RASP 140 can utilize the HTTP response message 104B to provide information to CASB 130 for the application transaction. In various embodiments, security metadata 110B injected into the HTTP response message 104B can include, but not be limited to, a transaction correlation/context identifier for correlation (which could be a correlation/context identifier generated by the CASB 130 or by the RASP 140 itself), response(s) to one or more queries initiated by CASB 130 towards RASP 140, a transaction risk and/or sensitivity score, transaction components, health status, security status, notification(s), security event identifying information, number of login failures or other login status, requests/response for information between products (such as Multi-Factor Authentication (MFA), etc.), application libraries, transaction code paths, exceptions occurring in the application runtime domain, files accessed, network sockets opened, transaction Backend visibility, permission use information, shell(s) launched, version information, outbound connection information, library vulnerabilities status, combinations thereof, and/or the like.

Similar to security metadata that can be inject into HTTP requests by CASB 130, security metadata injected into HTTP responses by RASP 140 (e.g., security metadata 110B) may be inserted into the HTTP header(s) as separate JWTs, may be combined into a single JWT, and/or may utilize a bitmap approach for injecting security metadata into HTTP responses.

As shown at 184, the augmented HTTP response message 104B including the security metadata 110B injected in header(s) 106B by RASP 140 is transmitted to CASB 130. As shown at 186, responses from the cloud application service 150, as well as with the security metadata 110B injected by the RASP 140, are inspected and subjected to security policies 134 by CASB 130 in the return direction for the application transaction.

In various embodiments, one or more actions can be triggered at the CASB 130 based on security policies 134 and any combination of the HTTP response from the cloud application service 150, the security metadata 110B injected into the header(s) 106B by the RASP 140, and or CASB-observed behavior for the application transaction. In some embodiments, the action(s) triggered CASB 130 may be based on the security metadata 110A included in the HTTP request (e.g., response(s) from the RASP 140 to queries/request(s) initiated by the CASB 130 and/or based on the type(s) of security metadata 110A included in the HTTP request message 104A sent to RASP 140).

In various embodiments, one or more policy actions that may be performed or otherwise enforced by the CASB 130 (e.g., at 186) may include, but not be limited to, reporting an incident to a SIEM system, reporting and/or storing information for at least one of client device 102, the user associated with the client device 102, the HTTP request message 104A, and/or the HTTP response message 104B, requesting additional information from client device 102, auto-configuring parameters within the CASB 130 to prepare for a potential threat (e.g., triggering an auto-escalation of defenses and/or configuring at least one of: one or more network parameters or one or more security parameters for at least one of the client device, a user associated with the client device, or the application operating via the client device), requesting a deep-dive on the user (e.g., for backend analysis based suspicion), request a stepped-up or enhanced authentication of the user of client device 102, blocking the entire HTTP response message 104B from being sent to the client device 102/user, blocking specific content/data from being sent to the client device 102/user, combinations thereof, and/or the like.

Following the inspection/application/enforcement of security policies 134 by CASB 130 and, if permitted by security policies 134, the security metadata 110B is removed from the header(s) 106B and the HTTP response message 104B is forwarded to the client device 102, as shown at 188.

Accordingly, embodiments herein facilitate enhanced CASB 130 and RASP 140 operations through which the CASB 130 and the RASP 140 (e.g., observability agent or embedded application security service) can exchange real-time, full-duplex communications via the Real-Time Transaction Integration Protocol as provided herein. The CASB 130, being implemented in-band for application transactions between client device 102/application 103 and cloud application service 150, can insert security metadata, such as information, commands, queries, etc. into HTTP request message(s) utilizing the Real-Time Transaction Integration Protocol in which the security metadata can be seen/consumed by observability agents (e.g., RASP 140). In one example, a correlation/context identifier for an application transaction and performance information inserted as security metadata in an HTTP request by the CASB 130 could be seen by an observability agent, which could respond to the CASB 130 (via security metadata inserted in an HTTP response) with its own correlation/context identifier, performance data, security risk information, user information, etc. Both sides of the exchange could store this information in real-time, which may facilitate not only sharing the information, but also providing a "true" correlation of the application transaction.

For example, the CASB 130 can insert relevant messaging via security metadata injected into an HTTP request message for an application transaction in order to send its correlation/context identifier for the transaction, relevant security information, and potentially one or more queries on the inbound request, which would then be ingested by the RASP 140 (e.g., any observability agent or embedded application security service) that may be installed/embedded for a backend cloud application service, such as for cloud application service 150. The RASP could then store the CASB 130 correlation/context identifier for the transaction with a correlation/context identifier for the transaction generated by the RASP 140 (or could use the CASB 130 correlation/context identifier for the transaction) and can include the correlation/context identifier in security metadata included in an HTTP response message sent to the CASB 130 so that the CASB 130 can store the backend/RASP correlation/context identifier with its own. Such operations may facilitate automatic transactional correlation for both the CASB 130 and other components "in-line" to the transaction, including security monitoring tools, such as RASP, running on the backend cloud application service.

In at least one embodiment, full-duplex communications between the CASB 130 and the RASP 140 (and/or any other security devices that may be present in system 100, as discussed in further detail below with reference to FIG. 2) may involve a registration or advertisement process. For such a process, the CASB 130 and the RASP 140 obtain awareness of the capability/capabilities of each other to communicate utilizing the RTIP communication protocol as discussed for embodiments herein. For example, in at least one embodiment, CASB 130 may utilize a multicast address to broadcast a query to determine/identify any RTIP capable devices such that any device listening on the multicast address, such as RASP 140, may provide a response to the CASB 130 that, in some instances, may identify RTIP capabilities of each responding device (e.g., a software/version number, device type, device credentials/identification, etc.). In at least one embodiment, CASB 130 may utilize a multicast address initiate a heartbeat multicast transmission at a predetermined interval in which the CASB 130 may advertise its RTIP capabilities (e.g., a software/version number, device type, device credentials/identification, etc.) to the cloud 120 and/or to enterprise network 112 such that any device that is listening on the multicast address may be made aware of CASB 130 being capable of performing RTIP communications. It is to be understood that these examples of determining RTIP capability awareness between devices in a network are provided for illustrative purposes only and are not meant to limit the broad scope of embodiments herein. Other techniques through which devices may be made aware of RTIP capabilities to enable full-duplex communications utilizing techniques as discussed herein can be envisioned.

Thus, broadly, embodiments of various operations herein that may facilitate the RTIP may encompass, but not be limited to, registration and/or advertisement of RTIP capabilities between a CASB and other observability agent(s) or embedded application security service(s) (e.g., a RASP) hosted with cloud application service(s) and/or other network security device(s) (e.g., as discussed with reference to FIG. 2, below) using a protocol and credentials/identification on a first transaction between the devices; insertion upstream of performance/security/correlation information by the CASB; and insertion downstream of performance/security/correlation information by the observability agent(s) hosted with the cloud application service(s) in which both the CASB and the observability agent(s) can "digest" information, store information, and/or perform one or more actions in real-time for one or more application transactions based on information exchanged using the RTIP full-duplex communications such that CASB and observability agent capabilities can be "blended" together to enhance the security posture of both the CASB and observability agent(s).

Figure 2:
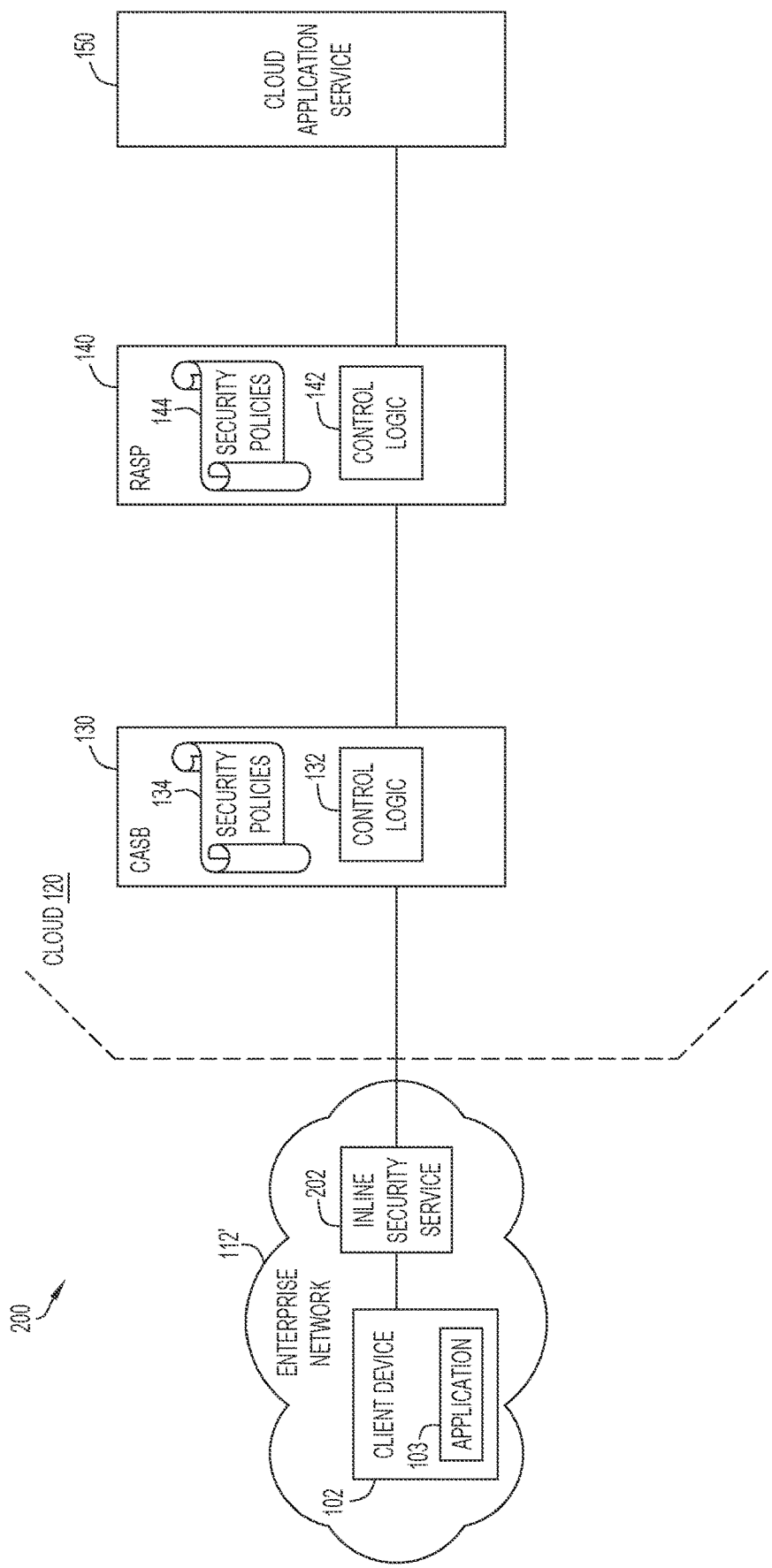
FIG. 2 is a block diagram of another system in which in-band application observability may be facilitated among one or more network devices or services, according to an example embodiment.

Referring to FIG. 2, FIG. 2 is a block diagram of another system 200 through which in-band application observability may be facilitated among one or more network devices or services, according to an example embodiment. As shown in FIG. 2, system 200 includes an enterprise network 112' and cloud 120. For the embodiment of FIG. 2, enterprise network 112' includes client device 102/application 103 and may further include an in-line security service 202 and cloud 120 includes CASB 130 (including control logic 132 and security policies 134), RASP 140 (including control logic 142 and security policies 144), and cloud application service 150.

While the embodiment of FIGS. 1A and 1B is described with reference to full-duplex CASB 130/RASP 140 RTIP communications, it is to be understood that such communications can easily be extended/applied to encompass communications between any in-line device(s)/service(s)/security platform(s) that may be implemented within an enterprise and/or cloud network in order to enable intelligent and strong security defenses within a cloud native network environment.

For example, as illustrated in FIG. 2, in-line security service 202, which may be implemented as any combination of firewall(s), WAF(s), DPI platform(s), service mesh(es), ingest controller(s), etc., can receive an HTTP request message from client device 102/application 103 for an application transaction and can augment the request (header(s) of the request) with (first) security metadata (information/queries/etc. provided based on security policies configured for the in-line security service 202) in which the (first) security metadata can be consumed/digested/stored/etc. by CASB 130 and/or may trigger one or more actions by CASB 130. In some instances, CASB 130 may include any of the (first) security metadata received from the in-line security service 202 and/or any additional information/queries/etc. that may be provided by CASB 130 in (second) security metadata included in the HTTP request that can, if permitted by policy, be transmitted to RASP 140, in which the (second) security metadata can be consumed/digested/stored/etc. by RASP 140 and/or may trigger one or more actions by RASP 140.

For an HTTP response message for the application transaction that may be generated by the cloud application service 150, (third) security metadata could be augmented to the HTTP response message by the RASP 140 (e.g., information and/or response(s) to CASB 130 queries) and the response message can, if permitted by policy, be transmitted to the CASB 130 such that, for the return path, the (third) security metadata can be consumed/digested/stored/etc. by CASB 130 and/or may trigger one or more actions by CASB 130. Finally, the CASB 130 can augment HTTP response message with (fourth) security metadata, which may include any of the (third) security metadata received from the RASP 140 and/or any additional information/responses/etc. (e.g., information and/or response(s) to in-line security service 202 queries) that may be provided by CASB 130 and, if permitted by policy, the HTTP response message, including the (fourth) security metadata can be sent to in-line security service 202. The in-line security service 202 can then consume/digest/store/etc. the (fourth) security metadata and/or one or more actions may be triggered at the in-line security service 202 based on the (fourth) security metadata and/or security policies configured for the in-line security service 202. If permitted by policy, the in-line security service 202 can then transmit the HTTP response message to the client device 102/application 103 upon removing the (fourth) security metadata from the message.

Accordingly, embodiments herein may also facilitate enhanced operations through which a CASB, such as CASB 130, can exchange real-time, full-duplex communications via the Real-Time Transaction Integration Protocol as provided herein via any combination of in-line backend observability agent(s) or embedded application security service(s) (e.g., RASP 140), as well as any combination of in-line frontend device(s)/service(s)/security platform(s), such as in-line security service 202, as shown for the embodiment of FIG. 2.

Thus, in contrast to current CASB implementations in which CASBs typically do not communicate in real-time with other security components in the context of a transaction (normally, this is performed post real-time via a set of application programming interface (API) calls) and also typically do not perform real-time transaction identifier correlation with other security components (normally, correlation is a difficult process that involves database transactions), embodiments herein can facilitate a full-duplex "transactional" conversation that can be performed between a CASB and components upstream and downstream. The CASB can share its correlation/context identifier for a transaction and the components can share their corresponding correlation/context identifier for the transaction within a single transaction request/response exchange. Such operations may be unique to the enhanced CASB operations as provided by embodiments herein.

As current CASB implementations may involve a CASB performing in-line functions and making API calls, such a current CASB implementation would not communicate in the full-duplex communication manner with other system components as can be provided by embodiments herein that involve communications facilitated via the Real-Time Transaction Integration Protocol. Accordingly, embodiments herein enable a 'transactional' component and 'deep visibility' for CASBs by utilizing the full-duplex RTIP messaging system that can be used integrate all 'in-band' security components using existing application transactions (e.g., HTTP request/response messaging) in real-time with automated correlation across the component spectrum, with no extra APIs or transmissions.

Figure 3:
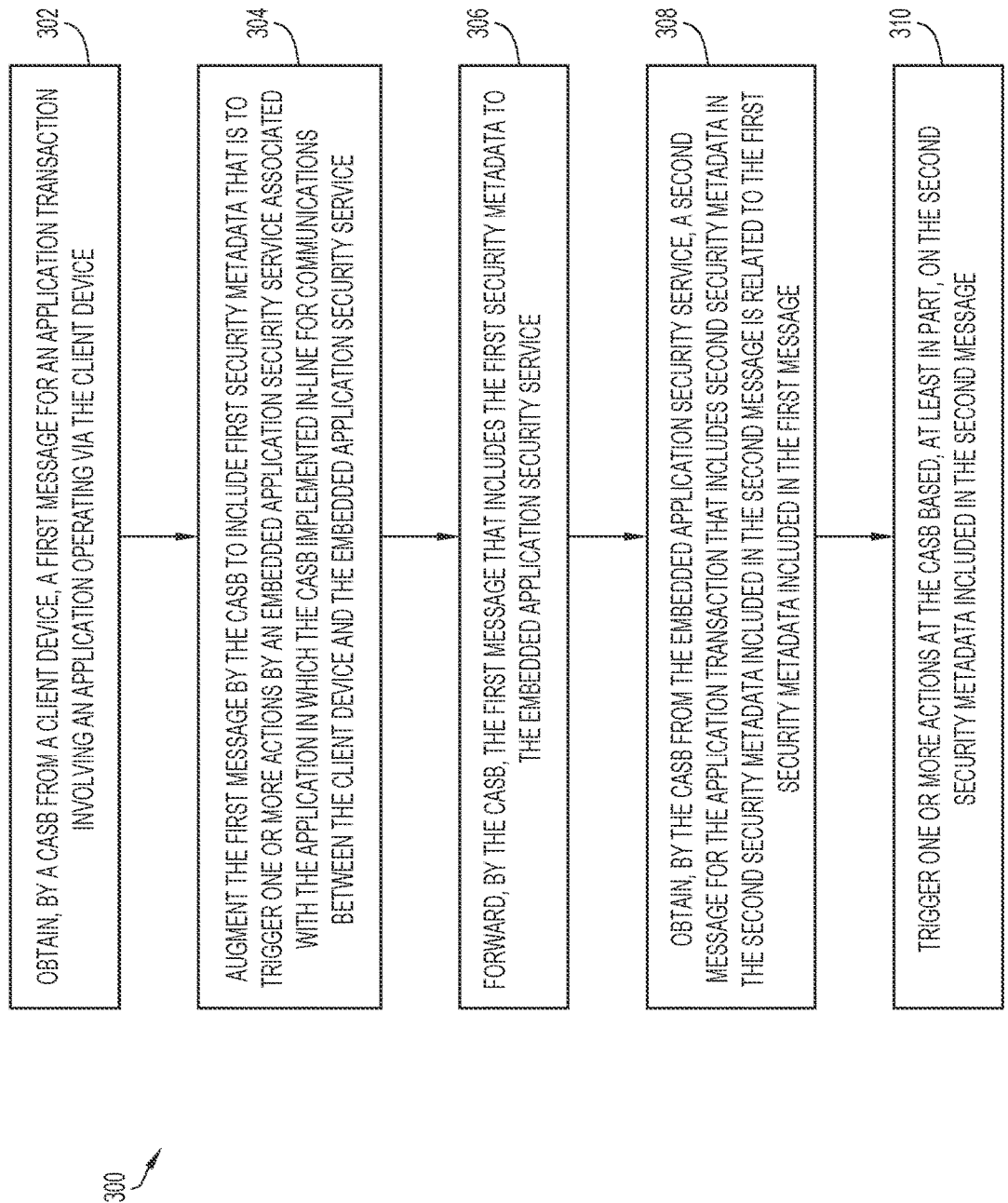
FIG. 3 is a flowchart depicting a method according to an example embodiment.

Referring to FIG. 3, FIG. 3 is a flowchart depicting a method according to an example embodiment. In at least one embodiment, method 300 may be associated with techniques that may be utilized to facilitate enhanced CASB in-line application observability, according to an example embodiment. In various embodiments, method 300 may be performed by a computing device or combination of computing devices as discussed for embodiments herein, such as CASB 130. In some embodiments, analogous operations may also be performed by an observability agent or embedded application security service, such as RASP 140, provided with/for a cloud application service 150 and/or any in-line security device(s)/service(s)/platform(s), such as in-line security service 202.

At 302, the method may include, obtaining, by a CASB (e.g., CASB 130) from a client device (e.g., client device 102), a first message for an application transaction involving an application operating via the client device. The first message may be a HTTP request message.

At 304, the method may include augmenting the first message by the CASB to include first security metadata that is to trigger one or more actions by an embedded application security service (e.g., RASP 140) associated with the application (e.g., cloud application service 150) in which the CASB implemented in-line for communications between the client device and the embedded application security service. Augmenting the first message by the CASB to include the first security metadata may include the CASB injecting the first security metadata into one or more headers of the first message (e.g., the HTTP request message) via one or more JWTs.

At 306, the method may include forwarding, by the CASB, the first message that includes the first security metadata to the embedded application security service. Although not shown in FIG. 3, in some embodiments, the method may include triggering one or more actions at embedded application security service based on the first security metadata included in the first message. In various embodiments, one or more actions triggered at the embedded application security service, based at least in part on the first security metadata included in the first message, may include, but not be limited to, restricting access to requested application resources (e.g., blocking an RPC, preventing the opening of a socket, etc.), reporting the suspicious request as an event to the CASB and/or a SIEM system, auto-configuring parameters within the RASP to prepare for a potential threat (e.g., triggering an auto-escalation of defenses), triggering OTEL gathering relating to the session (e.g., triggering an OTEL trace), requesting a deep dive on the user (for back-end analysis based suspicion), requesting stepped-up or enhanced authentication of the user, blocking the transaction entirely, combinations thereof, and/or the like. In some embodiments, the CASB may request specific action(s) be performed by the embedded application security service and/or may request specific information be provided by the embedded application security service via the first security metadata included in the first message.

At 308, the method may include obtaining, by the CASB from the embedded application security service, a second message for the application transaction that includes second security metadata in the second security metadata included in the second message is related to the first security metadata included in the first message. The second message may be an HTTP response message in which the second security metadata is included in one or more headers of the message via one or more JWTs injected into the message by the embedded application security service.

In some instances, the second security metadata included in the second message can be related to the first security metadata included in the first message. For example, in some embodiments, the first security metadata may include at least one query that identifies at least one of: information that the cloud application security broker is requesting from the embedded application security service or one or more actions that the cloud application security broker is requesting be performed by the embedded application security service. In such embodiments, the second security metadata may include response information that is provided by the embedded application security service in response to the at least one query contained in the first security metadata.

At 310, the method may include triggering one or more actions at the cloud application security broker based, at least in part, on the second security metadata included in the second message. In various embodiments, one or more policy actions that may be performed or otherwise enforced by the CASB may include, but not be limited to, reporting an incident to a SIEM system, reporting and/or storing information for at least one of client device, the user associated with the client device, the first (e.g., HTTP request) message, and/or the second (e.g., HTTP response) message, requesting additional information from client device, auto-configuring parameters within the CASB to prepare for a potential threat (e.g., triggering an auto-escalation of defenses and/or configuring at least one of: one or more network parameters or one or more security parameters for at least one of the client device, a user associated with the client device, or the application operating via the client device), requesting a deep-dive on the user (e.g., for back-end analysis based suspicion), request a stepped-up or enhanced authentication of the user of client device, blocking the entire HTTP response message from being sent to the client device/user, blocking specific content/data from being sent to the client device/user, combinations thereof, and/or the like.

Figure 4:
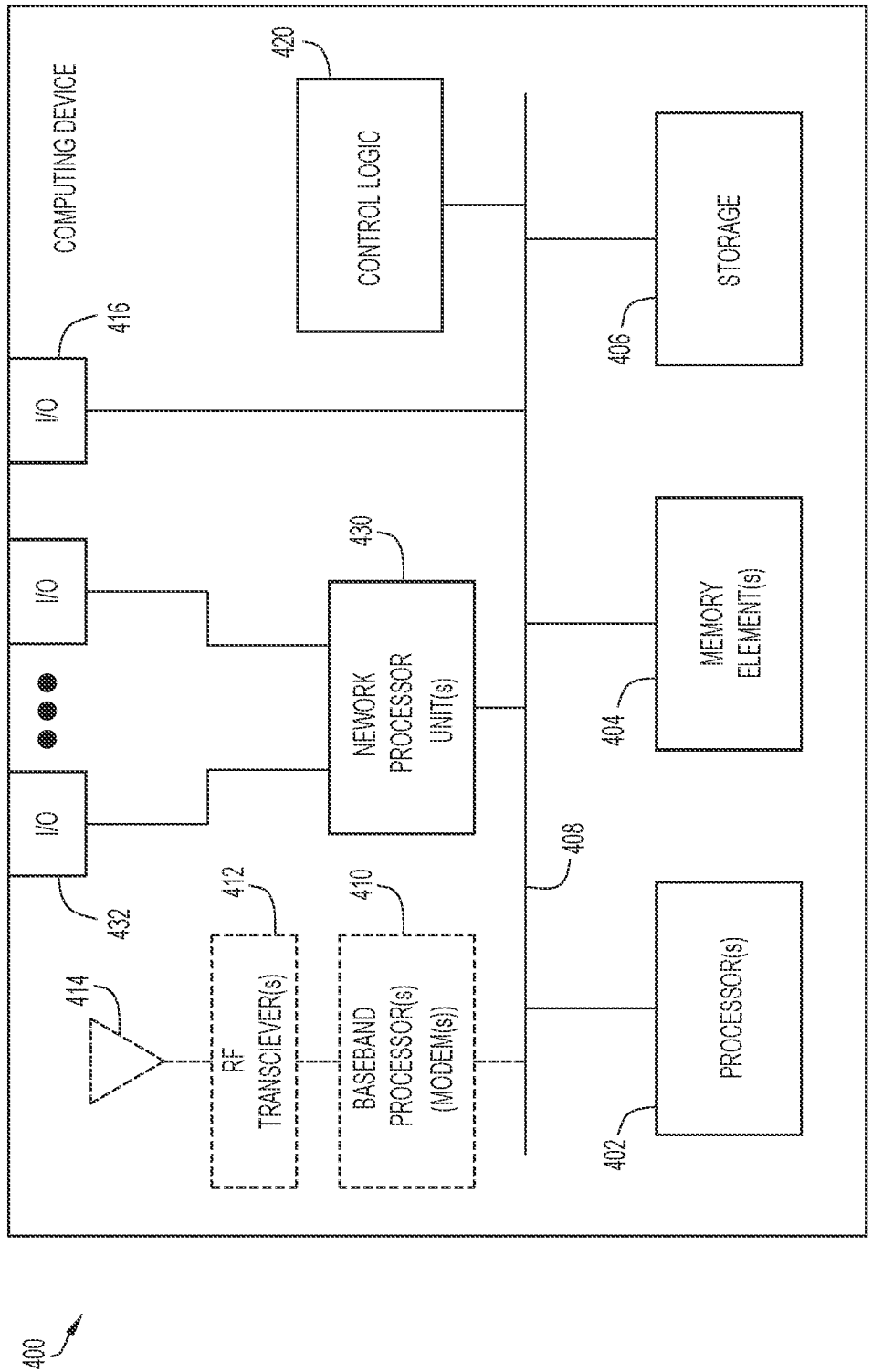
FIG. 4 is a hardware block diagram of a computing device that may perform functions associated with any combination of operations discussed in connection with techniques described for embodiments herein.

Referring to FIG. 4, FIG. 4 illustrates a hardware block diagram of a computing device 400 that may perform functions associated with operations discussed herein in connection with the techniques depicted in FIGS. 1A, 1B, 2, and 3. In various embodiments, a computing device or apparatus, such as computing device 400 or any combination of computing devices 400, may be configured as any entity/entities as discussed for the techniques depicted in connection with FIGS. 1A, 1B, 2 and 3 in order to perform operations of the various techniques discussed herein, such as CASB 130, RASP 140, in-line security service 202, client device 102, and/or cloud application service 150.

In at least one embodiment, the computing device 400 may be any apparatus that may include one or more processor(s) 402, one or more memory element(s) 404, storage 406, a bus 408, one or more network processor unit(s) 430 interconnected with one or more network input/output (I/O) interface(s) 432, one or more I/O interface(s) 416, and control logic 420. In various embodiments, instructions associated with logic for computing device 400 can overlap in any manner and are not limited to the specific allocation of instructions and/or operations described herein.

For embodiments in which computing device 400 may be implemented as any device capable of wireless communications, computing device 400 may further include at least one baseband processor or modem 410, one or more radio RF transceiver(s) 412 (e.g., any combination of RF receiver(s) and RF transmitter(s)), one or more antenna(s) or antenna array(s) 414.

In at least one embodiment, processor(s) 402 is/are at least one hardware processor configured to execute various tasks, operations and/or functions for computing device 400 as described herein according to software and/or instructions configured for computing device 400. Processor(s) 402 (e.g., a hardware processor) can execute any type of instructions associated with data to achieve the operations detailed herein. In one example, processor(s) 402 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 404 and/or storage 406 is/are configured to store data, information, software, and/or instructions associated with computing device 400, and/or logic configured for memory element(s) 404 and/or storage 406. For example, any logic described herein (e.g., control logic 420) can, in various embodiments, be stored for computing device 400 using any combination of memory element(s) 404 and/or storage 406. Note that in some embodiments, storage 406 can be consolidated with memory element(s) 404 (or vice versa) or can overlap/exist in any other suitable manner.

In at least one embodiment, bus 408 can be configured as an interface that enables one or more elements of computing device 400 to communicate in order to exchange information and/or data. Bus 408 can be implemented with any architecture designed for passing control, data and/or information between processors, memory elements/storage, peripheral devices, and/or any other hardware and/or software components that may be configured for computing device 400. In at least one embodiment, bus 408 may be implemented as a fast kernel-hosted interconnect, potentially using shared memory between processes (e.g., logic), which can enable efficient communication paths between the processes.

In various embodiments, network processor unit(s) 430 may enable communication between computing device 400 and other systems, entities, etc., via network I/O interface(s) 432 (wired and/or wireless) to facilitate operations discussed for various embodiments described herein. In various embodiments, network processor unit(s) 430 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 400 and other systems, entities, etc. to facilitate operations for various embodiments described herein. In various embodiments, network I/O interface(s) 432 can be configured as one or more Ethernet port(s), Fibre Channel ports, any other I/O port(s), and/or antenna(s)/antenna array(s) now known or hereafter developed. Thus, the network processor unit(s) 430 and/or network I/O interface(s) 432 may include suitable interfaces for receiving, transmitting, and/or otherwise communicating data and/or information (wired and/or wirelessly) in a network environment.

I/O interface(s) 416 allow for input and output of data and/or information with other entities that may be connected to computing device 400. For example, I/O interface(s) 416 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

For embodiments in which computing device 400 is implemented as a wireless device or any apparatus capable of wireless communications, the RF transceiver(s) 412 may perform RF transmission and RF reception of wireless signals via antenna(s)/antenna array(s) 414, and the baseband processor or modem 410 performs baseband modulation and demodulation, etc. associated with such signals to enable wireless communications for computing device 400.

In various embodiments, control logic 420 can include instructions that, when executed, cause processor(s) 402 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 420) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 404 and/or storage 406 can store data, software, code, instructions (e.g., processor instructions), logic, parameters, combinations thereof, and/or the like used for operations described herein. This includes memory element(s) 404 and/or storage 406 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer-implemented method is provided that may include obtaining, by a cloud application security broker from a client device, a first message for an application transaction involving an application operating via the client device; augmenting the first message to include first security metadata that is to trigger one or more actions by an embedded application security service associated with the application in which the cloud application security broker is implemented in-line for communications between the client device and the embedded application security service; forwarding the first message that includes the first security metadata to the embedded application security service; obtaining, from the embedded application security service, a second message for the application transaction that includes second security metadata; and triggering one or more actions at the cloud application security broker based, at least in part, on the second security metadata included in the second message.

In at least one instance, the first message is a Hypertext Transfer Protocol (HTTP) request message and the second message is an HTTP response message. In at least one instance, the first security metadata is included in one or more first Java Script Object Notation (JSON) Web Tokens (JWTs) included in one or more Hypertext Transfer Protocol (HTTP) headers of the first message and the second security metadata is included in one or more second JWTs included in one or more HTTP headers of the second message.

In at least one instance, the method may further include identifying, by the cloud application security broker, the first security metadata to include in the first message based on at least one of: a type of the first message, at least one security policy for the cloud application security broker, or information associated with the client device.

In at least one instance, the first security metadata includes at least one of: a location of the client device, an Internet Protocol (IP) address of the client device, a Media Access Control (MAC) address of the client device; a user identifier for a user associated with the client device; or a network access type of the client device. In at least one instance, the first security metadata includes at least one query that identifies at least one of: information that the cloud application security broker is requesting from the embedded application security service or one or more actions that the cloud application security broker is requesting be performed by the embedded application security service. In at least one instance, the second security metadata includes response information based on the at least one query included in the first security metadata.

In various instances, the one or more actions triggered at the cloud application security broker are further based on the first security metadata included in the first message. In various instances, the one or more actions triggered at the cloud application security broker include at least one of: blocking the second message from being sent to the client device; reporting or storing information for at least one of the client device, the first message, or the second message; requesting additional information from the client device; or configuring at least one of: one or more network parameters or one or more security parameters for at least one of the client device, a user associated with the client device, or the application operating via the client device.

In one instance, the first message further includes third security metadata that is included in the first message by a service or device that is provided within a network between the client device and the cloud application security broker. In at least one instance, the method may further include performing one or more additional actions at the cloud application security broker based on the third security metadata included the first message.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm·wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    obtaining, by a cloud application security broker from a client device, a first message for an application transaction involving an application operating via the client device and a cloud application service;
    augmenting, by the cloud application security broker, the first message to include first security metadata that is to trigger one or more actions by an embedded application security service associated with the cloud application service, wherein the cloud application security broker is implemented in-line between the client device and the embedded application security service;
    forwarding the first message that includes the first security metadata to the embedded application security service;
    obtaining, from the embedded application security service, a second message for the application transaction that includes second security metadata; and
    triggering one or more actions at the cloud application security broker based, at least in part, on the second security metadata included in the second message, wherein the second security metadata is to be removed from the second message upon the second message being transmitted to the client device.

2. The method of claim 1, wherein the first message is a Hypertext Transfer Protocol (HTTP) request message and the second message is an HTTP response message.

3. The method of claim 1, wherein the first security metadata is included in one or more first Java Script Object Notation (JSON) Web Tokens (JWTs) included in one or more Hypertext Transfer Protocol (HTTP) headers of the first message and the second security metadata is included in one or more second JWTs included in one or more HTTP headers of the second message.

4. The method of claim 1, further comprising:
    identifying, by the cloud application security broker, the first security metadata to include in the first message based on at least one of: a type of the first message, at least one security policy for the cloud application security broker, or information associated with the client device.

5. The method of claim 1, wherein the first security metadata includes at least one of: a location of the client device, an Internet Protocol (IP) address of the client device, a Media Access Control (MAC) address of the client device; a user identifier for a user associated with the client device; or a network access type of the client device.

6. The method of claim 1, wherein the first security metadata includes at least one query that identifies at least one of: information that the cloud application security broker is requesting from the embedded application security service or one or more actions that the cloud application security broker is requesting be performed by the embedded application security service.

7. The method of claim 6, wherein the second security metadata includes response information based on the at least one query included in the first security metadata.

8. The method of claim 1, wherein the one or more actions triggered at the cloud application security broker are further based on the first security metadata included in the first message.

9. The method of claim 1, wherein the one or more actions triggered at the cloud application security broker include at least one of:
blocking the second message from being sent to the client device;
reporting or storing information for at least one of the client device, the first message, or the second message;
requesting additional information from the client device; or
configuring at least one of: one or more network parameters or one or more security parameters for at least one of the client device, a user associated with the client device, or the application operating via the client device.

10. The method of claim 1, wherein the first message further includes third security metadata that is included in the first message by a service or device that is provided within a network between the client device and the cloud application security broker.

11. The method of claim 10, further comprising:
performing one or more additional actions at the cloud application security broker based on the third security metadata included the first message.

12. One or more non-transitory computer readable storage media encoded with instructions that, when executed by a processor, cause the processor to perform operations, comprising:
obtaining, by a cloud application security broker from a client device, a first message for an application transaction involving an application operating via the client device and a cloud application service;
augmenting, by the cloud application security broker, the first message to include first security metadata that is to trigger one or more actions by an embedded application security service associated with the cloud application service, wherein the cloud application security broker is implemented in-line between the client device and the embedded application security service;
forwarding the first message that includes the first security metadata to the embedded application security service;
obtaining, from the embedded application security service, a second message for the application transaction that includes second security metadata; and
triggering one or more actions at the cloud application security broker based, at least in part, on the second security metadata included in the second message, wherein the second security metadata is to be removed from the second message upon the second message being transmitted to the client device.

13. The method of claim 1, wherein the embedded application security service is to remove the first security metadata upon the first message being transmitted to the cloud application service.

14. The media of claim 12, further comprising:
identifying, by the cloud application security broker, the first security metadata to include in the first message based on at least one of: a type of the first message, at least one security policy for the cloud application security broker, or information associated with the client device.

15. The media of claim 12, wherein the first security metadata includes at least one query that identifies at least one of: information that the cloud application security broker is requesting from the embedded application security service or one or more actions that the cloud application security broker is requesting be performed by the embedded application security service.

16. A system comprising:
at least one memory element for storing data; and
at least one processor for executing instructions associated with the data, wherein executing the instructions causes the system to perform operations, comprising:
obtaining, by a cloud application security broker from a client device, a first message for an application transaction involving an application operating via the client device and a cloud application service;
augmenting, by the cloud application service, the first message to include first security metadata that is to trigger one or more actions by an embedded application security service associated with the cloud application service, wherein the cloud application security broker is implemented in-line between the client device and the embedded application security service;
forwarding the first message that includes the first security metadata to the embedded application security service;
obtaining, from the embedded application security service, a second message for the application transaction that includes second security metadata; and
triggering one or more actions at the cloud application security broker based, at least in part, on the second security metadata included in the second message, wherein the second security metadata is to be removed from the second message upon the second message being transmitted to the client device.

17. The system of claim 16, wherein the first message is a Hypertext Transfer Protocol (HTTP) request message and the second message is an HTTP response message.

18. The system of claim 16, further comprising:
identifying, by the cloud application security broker, the first security metadata to include in the first message based on at least one of: a type of the first message, at least one security policy for the cloud application security broker, or information associated with the client device.

19. The system of claim 16, wherein the first security metadata includes at least one query that identifies at least one of: information that the cloud application security broker is requesting from the embedded application security service or one or more actions that the cloud application security broker is requesting be performed by the embedded application security service.

20. The system of claim 19, wherein the second security metadata includes response information based on the at least one query included in the first security metadata.

* * * * *